United States Patent [19]

Laurent

[11] Patent Number: 4,994,509

[45] Date of Patent: Feb. 19, 1991

[54] MULTICOLORED COMPOUND FOR WALL COATING

[76] Inventor: Alain Laurent, 40, rue du Vieux Port, 69540 Irigny, France

[21] Appl. No.: 263,230

[22] Filed: Oct. 27, 1988

[30] Foreign Application Priority Data

Oct. 28, 1987 [FR] France .................................. 87 15323

[51] Int. Cl.$^5$ .......................... C08L 1/26; C08K 3/34; C09J 101/26; C04B 14/06
[52] U.S. Cl. ...................................... 524/35; 524/493; 106/169; 106/197.1; 106/490; 536/84; 536/87
[58] Field of Search ....................... 524/35, 42, 43, 44, 524/45, 46, 493; 536/84, 87

[56] References Cited

U.S. PATENT DOCUMENTS 4,354,000 10/1982 Vecchiato ........................... 524/386
4,612,251 9/1986 Fredenucci et al. ................ 428/511

FOREIGN PATENT DOCUMENTS 1351605 12/1962 France .................................. 524/35

*Primary Examiner*—Thurman K. Page
*Assistant Examiner*—Carlos Azpuru
*Attorney, Agent, or Firm*—Browdy and Neimark

[57] ABSTRACT

Aqueous dispersion of a multicolored wall coating composition comprising colored minerals in the form of quartz granules having transparent or translucent fibers agglomerated thereto, wherein said minerals are transparent or translucent after drying.

7 Claims, No Drawings

MULTICOLORED COMPOUND FOR WALL COATING

FIELD OF THE INVENTION

The object of the present invention is a multicoloured composition for wall coating, meant to be applied by projection, or by means of a roller in a single operation.

BACKGROUND OF THE INVENTION

There are different types of wall coatings: paint, wallpaper, or coatings projected over a greater thickness than paint, and to which it is possible to give a relief by means of a spatula or of a honeycombed roller. Although these coatings are liked due to their decorative character, they have, nevertheless, the disadvantage of being in a single colour, generally white, which limits the decorative effects likely to be obtained.

There are also coatings with a decorative appearance which are characterised by the presence of coloured grains, the latter being coloured grains of sand either coloured naturally, or artificially. These grains are overcoated with a binder of the latex type and deposited onto a substrate such as a wall, by means of a hawk. Over and above the fact that this method of application is long and fastidious, the quantity of coloured sand deposited per square meter is large, due to the rough granulometry of the sands and to the fact that the substrate must be entirely covered over. Thus the weights per square meter deposited can rise according to the grain sizes from 2 to more than 8 kg/m$^2$.

Another solution to obtain a coating comprising coloured particles consists in applying a background layer on a substrate, then to project by blowing over this substrate, which is still wet, dry multicoloured flecks, and finally to apply a layer of varnish. This process is extremely fastidious to implement since a high proportion of the flakes, at least half, fallen on the ground, must be recovered and projected again, with the risk of seeing the flakes being loaded with impurities. Moreover, a complementary brushing of the wall must be carried out before applying the varnish.

In both cases, the techniques are long and difficult to implement, allowing only the coating, in a single operation, of small surfaces.

SUMMARY OF THE INVENTION

The present invention aims at overcoming these disadvantages.

For this purpose, the composition which it concerns contains, in the mixture, coloured mineral charges appearing under the form of granules and of fibres scattered in water which, after drying, are transparent or translucent.

The composition originally appears in the form of a viscous paste, the viscosity of which is adjusted in relation to the proportions of water which it contains, in which the mineral charges are uniformly distributed. This composition can be projected, for instance by means of a machine on a support. It should be noted that the fibres surround and agglomerate the granules, which facilitates the projection of the compound, and prevent the rebound of the granules on the substrate to be decorated. In fact, the fibres form a sort of network holding the granules flat against the substrate. It has been discovered in a surprising manner that by using transparent or translucent fibres, the granules, after drying, remained perfectly visible without tarnishing the multicolour effect sought, although the granules are at least partially covered by fibres.

It is thus possible to obtain simply and quickly a mural coating with coloured grains by processing a much lower quantity of granules than that present in a hawked coating.

According to a first method of implementation, this composition contains cellulose fibres.

According to another method of implementation, this composition contains fibres in a synthetic material, chosen from among the polyolefins and the polyamides, in dispersion in water.

Moreover, this composition contains a binder soluble in water, such as a cellulosic ether.

This solution is interesting, on the one hand, by enabling the formation of a stiff paste which avoids the sedimentation of the granules and, on the other hand, by offering the possibility, by rehumidification of the coating, of removing it like a wall paper.

According to one possibility, this composition contains the following components:

| | |
|---|---|
| Cellulose fibres from 0.1 to 3 mm long | 5 |
| Cellulosic ether | 1 |
| Coloured quartz grains (1) from 0.1 to 2 mm diameter | 5 |
| Coloured quartz grains (2) from 0.1 to 2 mm diameter | 5 |
| Water | 83.9 |
| Bactericidal and fungicidal agents | 0.1 |
| | 100 |

In the formula shown above, the composition comprises two types of granules, for example of different colour.

Multiple mixtures of coloured quartz grains are possible, according to their grain size, or according to their colour, or according to both criteria together.

According to a method of implementation which is particularly economical, it is possible to first apply onto the substrate an underlayer of opaque product, and eventually dyed in the mass, then to project onto the latter a layer of composition according to the invention. It is thus possible to limit the thickness of the second layer which then allows the surface of the first layer to appear between the granules. It is possible to obtain a great number of combinations, each corresponding to a particular decoration, as a function of the coloration of the granules, of their size and of the shades of the first layer.

Inasmuch as this composition is meant to be applied by means of a roller in one operation, it contains moreover a polymer in an aqueous dispersion.

I claim:

1. An aqueous dispersion of a multicolored wall coating composition comprising colored minerals in the form of quartz granules from about 0.1 to about 2 mm in diameter having transparent or translucent fibers from about 0.1 to about 3 mm long agglomerated thereto wherein said materials are transparent or translucent after drying of said composition.

2. A composition according to claim 1, wherein said fibers are cellulose fibers.

3. A composition according to claim 1, wherein said fibers are selected from the group consisting of polyolefins and polyamides.

4. A composition according to claim 1 further containing a water-soluble binder.

5. A composition according to claim 4 wherein the binder is a cellulosic ether.

6. A composition according to claim 4 comprising the following components:

| | |
|---|---|
| Cellulose fibres | 5 |
| Cellulose ether | 1 |

-continued

| | |
|---|---|
| First colored quartz granules | 5 |
| Second colored quartz | 5 |
| Water | 83.9 |
| Bactericidal and fungicidal agents | 0.1 |

7. A composition according to claim 1 further containing a polymer in an aqueous dispersion.

* * * * *